Figure 1A:
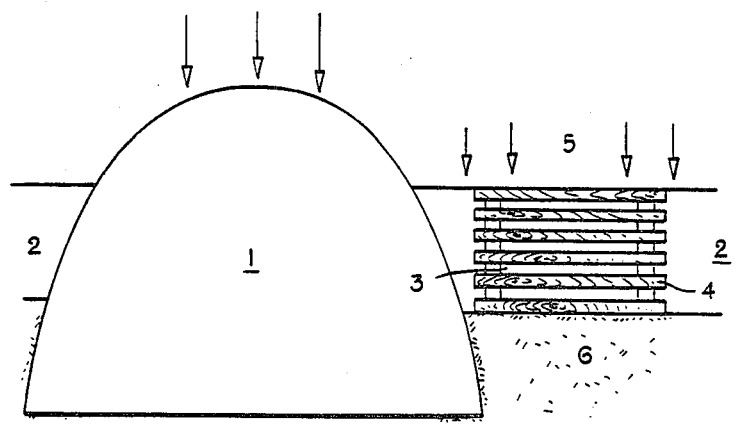

United States Patent [19]

Bassier et al.

[11] 4,441,840

[45] * Apr. 10, 1984

[54] PROCESS FOR THE DISPOSAL AND ECONOMIC USE OF THE RESIDUE OF THE EXHAUST GAS WASHERS OF FURNACES IN RELATION TO WASTE PRODUCTS

[75] Inventors: Friedrich Bassier, Duisburg; Klaus Goldschmidt, Essen, both of Fed. Rep. of Germany

[73] Assignees: Ruhrkohle AG; Steag AG, both of Essen, Fed. Rep. of Germany

[*] Notice: The portion of the term of this patent subsequent to Jan. 30, 1996 has been disclaimed.

[21] Appl. No.: 156,933

[22] Filed: Jun. 6, 1980

[30] Foreign Application Priority Data

Jun. 9, 1979 [DE] Fed. Rep. of Germany ....... 2923545

[51] Int. Cl.$^3$ .............................................. E02D 3/14
[52] U.S. Cl. ...................................... 405/267; 299/11
[58] Field of Search ............... 405/128, 258, 266, 267; 106/900; 299/11, 12

[56] References Cited

U.S. PATENT DOCUMENTS

| 2,492,212 | 12/1949 | Dailey | 405/266 X |
| 3,500,934 | 3/1970 | Magnuson | 405/267 X |
| 3,582,376 | 6/1971 | Ames | 405/267 X |
| 3,859,799 | 1/1975 | Jaco, Jr. | 405/128 |
| 3,927,719 | 12/1975 | Maser | 405/267 X |
| 4,136,998 | 1/1979 | Bassier et al. | 405/267 |
| 4,236,849 | 12/1980 | Kennedy-Skipton | 405/266 |

FOREIGN PATENT DOCUMENTS

| 952326 | 8/1974 | Canada | 405/267 |
| 648717 | 2/1979 | U.S.S.R. | 405/267 |

*Primary Examiner*—George A. Suchfield
*Attorney, Agent, or Firm*—Jon M. Lewis

[57] ABSTRACT

An improved process for utilizing the residues of a thermal energy power plant washer in which limestone or lime residue is converted to gypsum and the substrate is recrystallized to alpha sulfate hemihydrate and is treated with water. The improvement comprises mixing the alpha sulfate hemihydrate with at least one additive. The additive is selected from the group consisting of flue ash from a coal combustion installation, waste washings or local tailings from coal recuperation, granulate of ash from coal combustion, slag from steel production, clacium sulfate from exhaust gas washers, and calcium sulfate dehydrate from exhaust gas washers.

7 Claims, 3 Drawing Figures

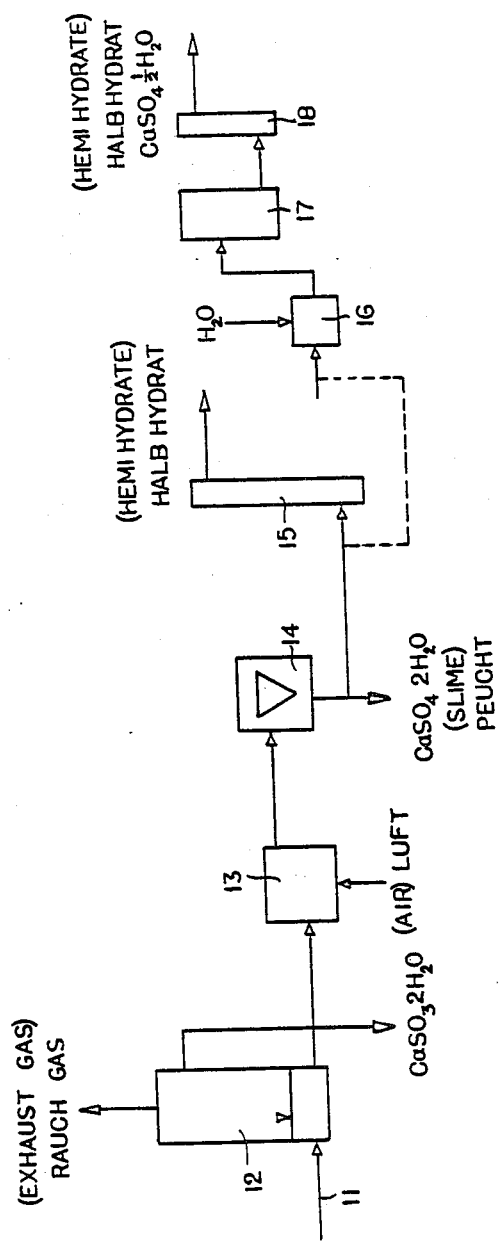

PROCESS FOR THE DISPOSAL AND ECONOMIC USE OF THE RESIDUE OF THE EXHAUST GAS WASHERS OF FURNACES IN RELATION TO WASTE PRODUCTS

The present invention is directed to a process for the disposal of the residue of the exhaust gas washers of furnaces, in particular, those furnaces in bituminous coal power stations by which the residue originating from the limestone or lime slurry is converted to calcium sulfate, the treated substrate is recrystallized to alpha-sulfate hemihydrate and diposed underground for mine protection. The dried alpha-sulfate hemihydrate is fed and conditioned with the addition of water in accordance with German Pat. No. 26 03 699 (translator's note: corresponding to U.S. Pat. No. 4,136,998 of Jan 30, 1979 hereby incorporated by reference).

The washing of exhaust gases, in particular those from power plants, provides desulphuring through absorption with limestone ($CaCO_3$) or lime in the form of an oxide ($CaO$) or hydroxide ($Ca(OH)_2$). The resulting residues contain the discharged $SO_2$ mainly in the form of calcium sulphite ($CaSO_3 \cdot X_xH_2O$). The sulphite occurs in fluid form and contains, if the occasion arises, also dust, if the lime, respectively limestone, is employed in wet separators which simultaneously serve for dust and $SO_2$ separation. The calcium sulphite can however also be relatively dust-free if electrical dust filters are provided before the washer. The described residues are already available in relatively large quantities. The residues, however, are difficult to handle because of their consistency and their chemical characteristics; in particular their disposal causes serious difficulties. For this reason the disposal of such residues has not been authorized until today by the inspecting administration.

According to German Pat. No. 26 03 699, the solution consists in having the converted substrate from the residues of the exhaust gas washers recrystallized to alpha-sulfate hemihydrate and placed underground for mine protection, whereby the alpha sulfate hemihydrate is transported in the dry state and treated by the addition of water. The alpha sulfate hemihydrate replaces the conventional underground mine protection with mine or construction wood (wood pillar). As a matter of fact, these woods are usually piled up on each other on the side of the vein, once the coal has been extracted. With such piling of wood into a pillar, a connection is established between the hanging wall and the deads of the vein, for the purpose of sustaining the hanging wall in the zone of the mine and therefore to laterally reduce the pressure exerted on the mine structure and maintain substantially the form and section of the mine profile. As a result, the frame of the mine is not airtight, so that when wooden pillars are used for mine protection, a draft between galleries is not prevented and a simmering fire can take place in the "old mine".

Piling wood definitely requires much work, the expense of material is high, and the risk of fire is not eliminated. In contrast, the alpha-sulfate hemihydrate can be fed pneumatically at the charging point with minimal word cost and in any desirable form. Establishing a barricade of this sort provides a complete sealing against airdraft, thus preventing a simmering fire in the "old mine," the barricade being itself uncombustible.

Nevertheless, in practice, difficulties have been encountered with the establishing of a barricade of alpha hemihydrate in a mine. When such established barricades are used, deformations of the mine curvature and swellings of the deads occur. Accordingly, the invention stems from the realization that structural deformations and the swelling of the deads result from the transmission of the pressure of the mountain from the hanging wall to the lying wall through the extremely rigid established barricade of alpha sulfate hemihydrate. Indeed, the wooden pillars also transmit the pressure of the mountain; however, they are very flexible, in contrast to the established mine barricades of alpha sulphate hemihydrate. In accordance with the invention, an adjustable flexibility is achieved with established barricades of alpha sulphate hemihydrate by the use of additives. It has been found that residues can be used as additives, in particular mineral residues. As a result, not only the problem of disposal of residues from washing of gas exhaust but also other problems are solved.

In the building materials made with alpha sulfate hemihydrate and various mineral waste products for establiahed mine barricades, the alpha sulfate hemihydrate has the role of a hydraulic binding agent. Flue ash, for instance, from the electrical cleaner of the power stations can be used as additive to take advantage of their property to break and their latent hydraulic characteristics regarding the solidification and the positive influence on workability of the granular form. Moreover, the flue ash reduces the amount in water needed in the process of cementing.

The contemplated use, according to the invention, of flue ash eliminates a serious problem of disposal.

As additives can be used, also tailings and deads from coal extraction and/or ash granules and/or slags from coal combustion and/or slag from steel and iron industries and/or the calcium sulfite derived from exhaust gas washers with a lime base and/or the calcium sulfate dehydrate worked out from it.

With the addition of ash granules and also granular additives such as slag from furnaces, there remains the so-called sweep grain mixed as a dust. This prevents the settling of the material in critical regions of the pneumatic conveyor of the dust of alpha-sulfate hemihydrate and the flue ash. Moreover, the sweep grain allows a more stable texture in the packing.

The calcium sulfate derived from treatment of the residues of the exhaust gas washers from coal power stations and/or the calcium sulfate-dehydrate worked out from it would be unfit for the use in established mine barricades if alone. Its final solidity would be insufficient when mixed with alpha sulfate hemihydrate; the high rigidity of the latter is reduced and the desired flexibility is given by the additive.

According to a further embodiment of the invention, the flexibility of the material is adjusted to the existing conditions, e.g., the expected pressure of the mountain and the constitution of the top and laying walls by mixing different additives. Adaptation to existing conditions requires, with the conventional use of wood, a lot of experience, and success rests on an evaluation with different thicknesses of wood piles. Mixing of different additives, in accordance with the invention, can be performed from judging the situation, without any estimation and experience, on the basis of given mixing proportions.

The conversion into gypsum of the residues from exhaust gas washers and the recrystallization are undertaken in part before the transport of the alpha sulfate hemihydrate and the chosen additive. Otherwise, the gypsum obtained by conversion can be transported from the coal power station or from the conversion installation to a distributing station, to be recrystallized to alpha sulfate hemihydrate, to be mixed or homogenized with additive (such as flue ash) and conveyed underground as a mixture. The production of the mixture can also be performed underground.

Preferably the mixture is used without the addition of an accelerator, is conveyed pneumatically, and water is supplied at the end of the transport before transformation.

All mixtures of binding agent "alpha sulfate hemihydrate" and additive are usable without an accelerator, they are not affected by humidity, they exhibit a good handling capability and become bound only when water is supplied. Therefore, they are easily conveyed and blown on the slope of the previous section, e.g., without separation and accordingly without causing a crossing. For this reason the usual underground conveyor blower equipment is suitable. An additional advantage resides in that due to the good wetting capacity and water acceptance of the alpha-sulfate hemihydrate and the flue ash, the formation of dust during charging is much reduced.

Figure 1B:
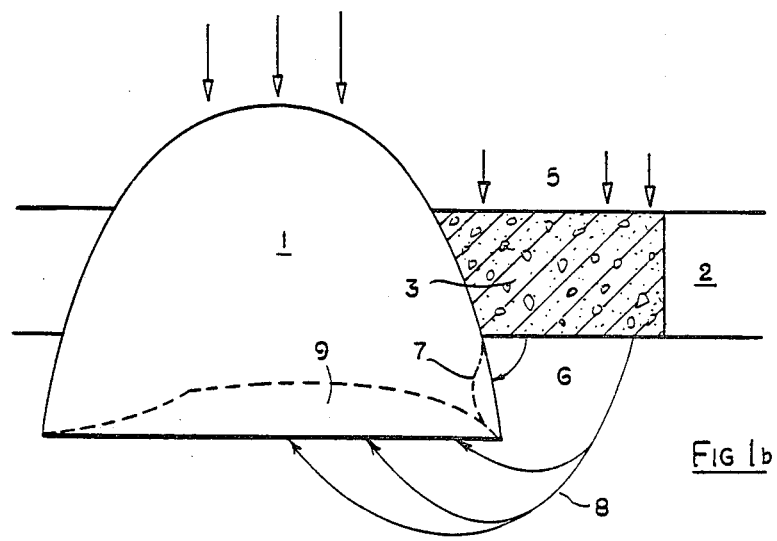

FIGS. 1A and 1B illustrate mine barricades and FIG. 2 is a flow scheme for the production of alpha hemihydrate and its application.

Referring to FIG. 1, a mine is designated by 1 with a vein 2 against it. After the vein 2 has been exploited, a mine protection 3 is established across the mine in the existing empty space. This protection consists according to FIG. 1A in a structure conventionally built with mine logs, wooden pillars or other wooden structure 4. The mine protection 3 creates a connecting support across the vein 2 between the top and laying walls 5 and 6. This sort of mine protection resiliently supports the mountain. With a mine protection in the form of an established barricade of pure alpha-sulfate hemihydrate according to FIG. 1B, the high pressure from the mountain causes a deformation 7 of the mine structure and/or a rupture schematically indicated by arrows 8 of the laying and back walls 9 in the free cross section of the mine.

In accordance with the invention, instead of charging 100 percent of alpha hemihydrate, a mixture of alpha sulfate hemihydrate and additives is used for the construction of a flexible mine barricade. The alpha-sulfate hemihydrate consists according to FIG. 2 of smoke exhaust which comes from a furnace (not shown), passes in an exhaust pipe 11 through an intermediate exhaust gas wash 12 to a chimney, and from there into the open atmosphere. The sulfur dioxide contained in the exhaust gas is absorbed in a water solution.

Through the use of lime there evolves $CaSO_3.2H_2O$ (dehydrate sulfide). The residues from the lime wash are oxidized by air in a vessel 13. The derived residues of the lime wash are passed into a thickener 14. The thickener 14 generates a slime $CaSO_4.2H_2O$ (sulfate hydrate). When the resulting slime is fed into a drier 15, due to substantial crystallization, a so-called Beta-sulfate hemihydrate gypsum evolves.

To produce alpha-sulfate hemihydrate, the lime slime is reacted with water in a mixer 16. The resulting gypsum-water slime is continuously pumped into an autoclave 17 and under defined conditions (temperature less than 150° C.) recrystallized into alpha-gypsum. Additives for controlling the value of the pH. and for changing the cyrstal forces within the alpha-gypsum can be added and classified to make possible the production of alpha-gypsum with different characteristics. Such alpha-gypsum is extracted continuously in water suspension from the autoclave and is separated from the liquid phase in a centrifuge (not shown). By drying, for instance in a circulation drier, alpha-gypsum ($CaSO_4.\frac{1}{2}H_2O$/alpha hemihydrate) evolves in powder form as at 18. Hereinafter, examples are given for treatment of the alpha sulfate hemihydrate in accordance with the invention.

EXAMPLE 1

Alpha hemihydrate are mixed with flue ash ("steament") in the ratio 60/40%. Good flowability and reticulation capability of the material result.

After 5 hours, there exists an average resistance to pressure of 122 kilos per square centimeter; after 24 hours, and 150 kilos per square centimeter. A material density of 1.42 ton per cubic meter was obtained. The ratio of water to solid when mixed (W/S value) was 0.38.

EXAMPLE 2

(a) By mixing 50% of alpha hemihydrate with 50% of flue ash
(b) By mixing 40% of alpha hemihydrate with 60% of flue ash.

For W/S (water to solid) ratios of 0.20 to 0.30, the following resistance to pressure was achieved:

| Duration of Cementation (hours) | 50% flue ash (steament) 50% alpha-hemihydrate ($N/m^2$) | 60% flue ash (steament) 40% alpha-hemihydrate ($N/m^2$) |
| --- | --- | --- |
| 0.5 hour | 6.0 | 3.0 |
| 1 hour | 8.0 | 3.5 |
| 5 hours | 8.7–11.5 | 4.1–5.5 |
| 24 hours | 9.9–13.9 | 5.1–8.5 |
| 7 hours | 21.7–26.4 | 5.9–6.0 |

I claim:

1. An improved process for utilizing the residues of a thermal energy power plant washer in which the limestone or lime residue resulting from the washer is converted to gypsum, the substrate is recrystallized to alpha sulfate hemihydrate and is treated with water, wherein the improvement comprises the step of mixing with the alpha sulfate hemihydrate, at least one additive selected from the group consistency of flue ash from a coal combustion installation, waste washings or local tailings from coal recuperation, granulate of ash from coal combustion, slag from coal combustion, slag from steel production, calcium sulfate from exhaust gas washers, and calcium sulfate dehydrate from exhaust gas washers.

2. The improved process according to claim 1 wherein the mixture of alpha sulfate hemihydrate, treated with water, and at least one additive includes the step of forming a protective structure within a mine with said mixture, said protective structure having an adjustable flexibility according to the proportions of additive mixed with the alpha sulfate hemihydrate treated with water.

3. The improved process according to claim 2 wherein the mixture of alpha-sulfate hemihydrate, treated with water, and at least one additive consists of at least 50% of said at least one additive.

4. The improved process according to claim 3 wherein the mixture of alpha sulfate hemihydrate, treated with water, and at least one additive consists of between 20 to 60 percent water.

5. The improved process according to claims 1, 2, 3, or 4 wherein the alpha sulfate hemihydrate is mixed with at least one additive prior to the treatment thereof with water.

6. The improved process according to claim 5 wherein the steps of combining the alpha sulfate hemihydrate, water and at least one additive to form a protective structure within a mine is effected underground.

7. The improved process according to claim 5 wherein the mixture of alpha sulfate hemihydrate and at least one additive is conveyed pneumatically into the mine and wherein water is added at the end of the conveyance thereinto.

* * * * *